Feb. 21, 1939.  R. H. BARGE  2,148,253
COMPOUND METER SYSTEM
Filed July 22, 1936
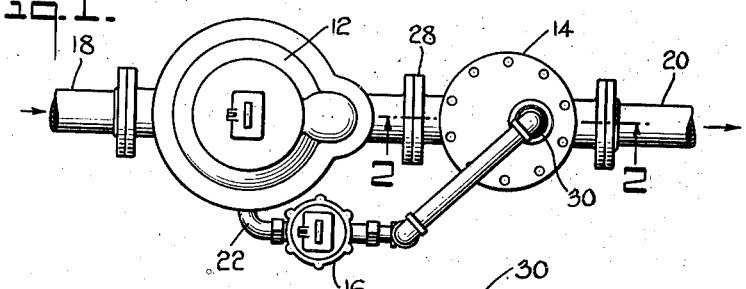
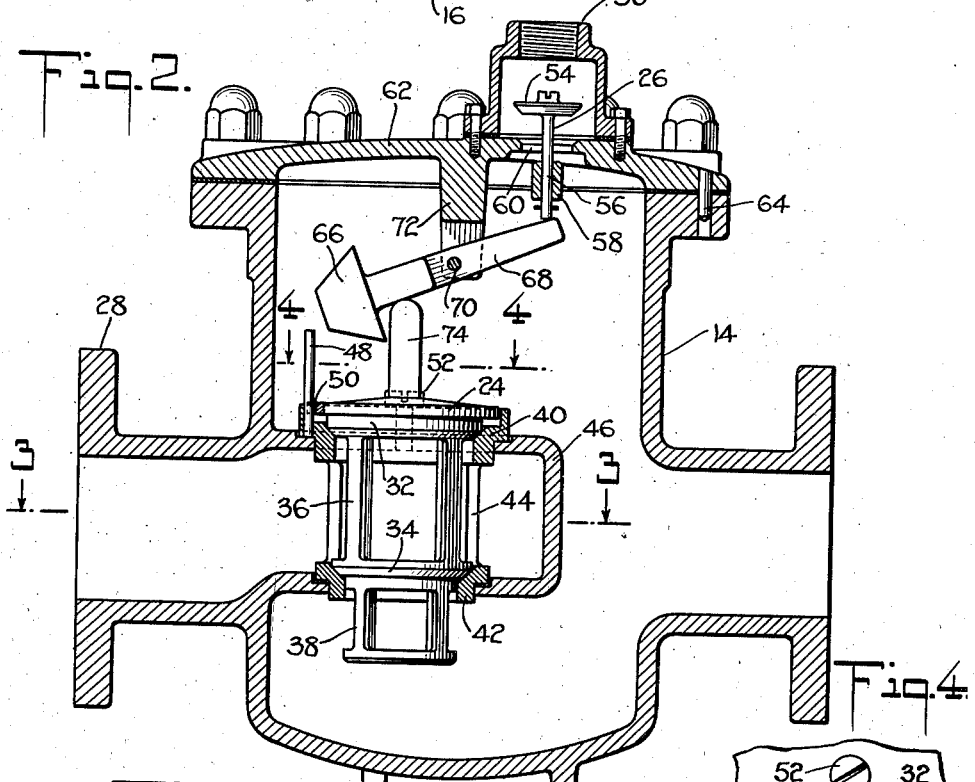
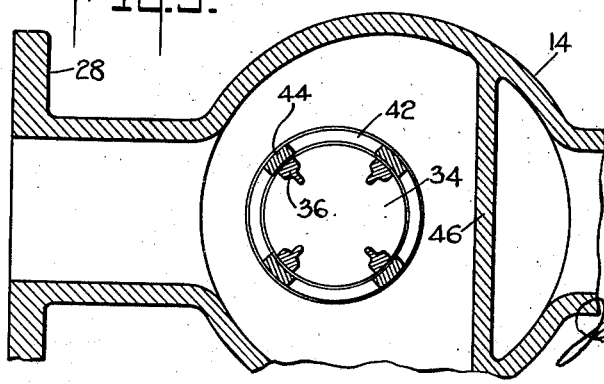
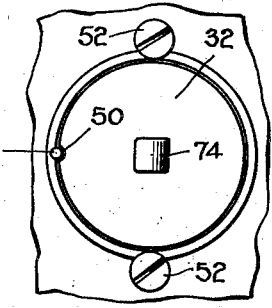
INVENTOR
Raymond H. Barge
BY
*James T. Franklin*
ATTORNEYS Patented Feb. 21, 1939

2,148,253

UNITED STATES PATENT OFFICE 2,148,253

COMPOUND METER SYSTEM

Raymond H. Barge, Mineola, N. Y., assignor, by mesne assignments, to Reconstruction Finance Corporation, New York, N. Y., a corporation Application July 22, 1936, Serial No. 91,867

9 Claims. (Cl. 73—197)

This invention relates to flow meters, and more particularly to a compound meter system.

Because of leakage, slippage, and the like, a large flow meter will not record a small flow, the latter merely trickling through the meter without actually driving the operating mechanism. On the other hand, a small meter which is sensitive to a small flow is incapable of accommodating a large flow. For the above reasons, in installations where the flow may vary over an extremely wide range, a compound meter system may be used employing both small and large meter elements and a valve arrangement which normally closes and prevents flow through the large meter, but which opens when subjected to the increased pressure accompanying a large flow. The total reading may be obtained by adding the separate readings of the two meters. In order to determine the percentage of large flow demand and small flow demand, it is desirable to provide a compound valve system which not only opens to supply liquid to the large meter upon large demand, but which at the same time cuts off the small flow in parallel to the small meter.

The primary object of the present invention is to generally improve compound meter systems of the character above described. A more particular object is to obtain a dependable instantaneous change-over from the meter to the other while employing mechanism which is comparatively simple and inexpensive in character. Other objects are to eliminate any tendency of the valves to chatter; to obtain abrupt positive closing of the small valve the moment the large valve reaches the cracking point; to provide both the small and large valves with seats against which the valves close with a leak-proof seal; and to interrelate the small and large valves by mechanism providing for lost motion or independent movement of the valves, whereby the operation becomes so rapid that the change-over cannot be detected.

To the accomplishment of the foregoing and such other objects as will hereinafter appear, my invention consists in the compound meter elements and their relation one to the other, as are hereinafter more particularly described in the specification and sought to be defined in the claims. The specification is accompanied by drawing in which:

Fig. 1 is a plan view of the meter and valve system;

Fig. 2 is a section through the compound valve, said section being taken in elevation in the plane of the line 2—2 of Fig. 1;

Fig. 3 is a horizontal section through the differential valve element, and is taken in the plane of the line 3—3 of Fig. 2; and Fig. 4 shows the differential valve member in plan, that is, looking in the direction of the arrows 4—4 of Fig. 2.

Referring to the drawing, the compound meter system of my invention comprises a large meter 12 and a large valve housed in a compound valve housing 14, the meter and valve being connected in series. The system further comprises a small meter 16 and a small valve also housed in compound valve housing 14, the small meter and small valve being arranged in series with one another and in parallel with the large meter and large valve. The liquid flowing through the main pipe or conduit 18 may therefore flow through either the large meter 12 or the small meter 16, for the large and small valves are so interrelated that only one or the other is open at one time. The fluid leaving the compound meter system is discharged through pipe or conduit 20. From one viewpoint, it may be said that the small meter 16 is a bypass meter which bypasses the large meter 12 whenever the flow is too small to be accurately recorded on the large meter.

The large and small meters 12 and 16 may be of conventional character and therefore require no detailed description. In order to simplify the installation of the compound meter system, the small meter is preferably piped into the large meter 12 rather than into the pipe line 18. It will be understood, however, that while the liquid going through the small meter preliminarily fills the chamber of the large meter, it does not drive or actuate the large meter, for there is no true flow through the piston or driving part of the large meter when the valve in series therewith is closed. In other words, the elbow 22, threadedly received in the casing of meter 12, leads into the casing at the entrant side of the meter body, and the liquid flowing through elbow 22 reaches the same without driving the large meter.

The compound valve arrangement in casing 14 is shown in greater detail in Figs. 2 through 4, and referring to these figures it will be seen that the housing 14 is provided with a large differential valve 24 and a small valve 26 which is preferably of the poppet type. It will be understood that large valve 24 is connected in series with the large meter 12, the entrant flange 28 corresponding to flange 28 in Fig. 1. It will also be understood that the small valve 26 is connected in series with the small meter 16, the entrant chamber 30 corresponding to chamber 30 in Fig. 1. It is important to note that the small valve 26 opens in a direction opposed to the flow of liquid therethrough. Large valve 24, on the other hand, opens in the same direction as the flow of liquid. The large valve 24 is preferably a differential valve in order to obtain extremely large flow passages while proportioning the pressure area for opening the valve to a desired amount. It is probably unnecessary to explain that the upper valve disc 32 is larger in area than the lower valve disc 34, and that the liquid flowing into the valve through flange 28 therefore tends constantly to open the valve. Discs 32 and 34 are connected by upright guide bars 36, while another guide cage 38 of smaller diameter depends from the lower disc 34. The movable valve assembly is received in a generally cylindrical member comprising an upper seat 40 and a lower seat 42 connected by suitable bars 44. The seat assembly is itself set into a suitable chamber 46 forming a part of the cast body 14. To prevent rotation of the valve 24, thereby keeping the bars 36 and 44 in alignment, as is clearly shown in Fig. 3, the valve is provided with a guide rod 48 projecting upwardly from seat 40 and cooperating with a mating recess 50 on the periphery of upper valve disc 32, this being best shown in Fig. 4. Fig. 4 also shows screws 52 which function to hold the valve seat assembly in place.

The small valve 26 is also a differential valve in a sense, in that the exposed area at the top is greater than the exposed area at the bottom, but in this case the flow being dealt with is comparatively small and the relatively complex cage construction is therefore not necessary. The small valve opens in a direction against the flow of liquid therethrough, that is, the exposed area facing the incoming liquid is the larger area. For this reason, the valve tends quickly to close. Moreover, it will be noted that the valve closes against a definite seat so that it may be sealed tight without that leakage which necessarily accompanies the use of a slidable valve having appreciable clearances. Specifically, the valve comprises a frustro-conical valve disc 54 carried at the upper end of a valve rod 56, the latter being reciprocably received in a support 58 which bridges the valve opening 60 and which forms a part of the cast top 62 of the casing. Chamber 30 surrounding the valve is a separate member which is bolted in place with a suitable sealing gasket between it and the top 62. The latter is bolted to case 14, as will be evident from the drawing, and it will be noted that a locating pin 64 is preferably provided in order to make certain that the top 62 is properly placed on casing 14.

The large valve 24 is normally held closed and the small valve 26 is normally held open by a weight 66. This weight is carried at one end of an arm 68 pivoted at 70 on a hanger 72 cast integrally with the top 62. The weighted end of arm 68 bears against an upstanding projection 74 formed at the top of the large valve 24. The upper end of this projection is suitably rounded, as shown in Fig. 2, to form a smooth bearing surface cooperating with arm 68. The outer or free end of arm 68 bears against the lower end of valve rod 56, as is also shown in Fig. 2. It will be noted that the parts need not be and in fact preferably are not connected together by pins to form a definite linkage system, and instead the present arrangemet leaves the small valve free of arm 68 so that the valve may be tightly seated when the large valve opens, for arm 68 is preferably arranged to move further than valve 26, thereby establishing a substantial clearance therebetween when the large valve is open.

The operation is as follows: With a small flow of liquid, the large valve remains tightly closed and a small valve is held open. The liquid thus flows through the small meter and is there recorded. As the flow or pressure head increases, a critical point is reached where the large valve tends to just "crack" open. This lowers arm 68 slightly, and the pressure against the small valve causes it to close slightly. Even this slight closing of the small valve, however, increases the pressure against the large valve which in turn opens further, permitting the small valve to close still further, and so the shift from operation of the small meter to operation of the large meter, when once started, proceeds rapidly to a concluding condition in which the small valve is closed and there held closed by the water pressure thereagainst, while the large valve is open.

Conversely, on the "downstream side", that is, when the flow is decreasing, the system finally reaches a critical point where the large valve is lowered so far that the weight tends to open the small valve. The resulting flow through the small valve further decreases the flow through the large valve and so permits further closing of the large valve, and so on, until the system changes to a position in which the large valve is entirely closed and the small valve is open.

In other words, the arrangement is unstable during transition, that is, when both valves are simultaneously open or at the critical point of change, but is stable with either valve fully closed.

The poppet valve is preferably arranged to open a comparatively limited amount, the opening being such as to give a flow area therearound equal to that desired for the small meter and also equal to the area of the opening or flow passage 60 surrounding the valve stem. The valve should not be opened excessively, first, because the amount of opening should be less and is preferably made substantially less than the amount of clearance or movement of the free end of arm 68 produced when the large valve opens; secondly, to avoid the possibility of chattering of the small valve at the critical point or change-over point; and thirdly, because if the valve is opened only a moderate amount, the partial closing movement of the valve which results at the "upstream" critical point when the large valve begins to open, substantially reduces the flow through the small valve, thus increasing the flow to the large valve, all as previously described. If, on the other hand, the poppet valve were elevated to a very high point, the small initial movement resulting from a slight opening of the large valve might not appreciably change the flow through the small valve and hence would not necessarily produce the desired instability or instantaneous shift from one meter to the other.

An important advantage of the present system is that the change-over is instantaneous—so much so that it can be detected only with difficulty when observing measuring instruments connected to the system for study of its operation. This is to be contrasted with certain arrangements in which the large and small valves are rigidly connected together and produce a relatively gradual change-over.

Another advantage of the valve arrangement here shown, is that once the small valve closes, no amount of increased pressure can ever change the relation of the parts, for increased pressure merely closes the small valve more tightly. This is to be contrasted with the use of a small valve which opens in the direction of instead of in a direction against the flow, for with the former if the pressure becomes exceedingly great there is a tendency to open the small valve as well as the large valve in order to permit an increased total flow. This, however, will spoil the discrimination between large and small demand, for subsequently determining the relative amounts of each. Some arrangements result in chattering or vibration of the valve system, but this is eliminated by the present invention. Moreover, in arrangements using a sliding valve, it is necessary to provide clearance, and leakage inevitably takes place through such clearance.

It is believed that the construction, operation, and advantages of my improved compound meter system will be apparent from the foregoing detailed description thereof. It will also be apparent that while I have shown and described my invention in a preferred form, many changes and modifications may be made in the structure disclosed, without departing from the spirit of the invention, defined in the following claims.

I claim:

1. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, said large valve being a differential valve so faced that water pressure tends normally to open the valve, said small valve opening in a direction against the flow of liquid and tending normally to close, and weight means so arranged as to tend under the influence of gravity to open the small valve and to close the large valve, said weight being elevated when the large valve is opened and thereby establishing clearance releasing and permitting abrupt closing of the small valve.

2. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, said large valve being a differential valve so faced that water pressure tends normally to open the valve, said small valve being a poppet valve opening in a direction against the flow of liquid and tending normally to close, and weight means so arranged as to tend under the influence of gravity to open the small valve and to close the large valve, said weight being elevated when the large valve is opened and thereby establishing clearance releasing and permitting abrupt closing of the small valve.

3. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, a weight normally tending to close the large valve and to open the small valve, said weight being moved out of the way of the small valve by an amount greater than the movement needed to close the small valve when the large valve is open, the small valve being so arranged that the pressure of liquid thereagainst tends normally to close the same.

4. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, a weight normally tending to close the large valve and to open the small valve, said weight being moved out of the way of the small valve by an amount greater than the movement needed to close the small valve when the large valve is open, the small valve being so arranged that the pressure of liquid thereagainst tends normally to close the same, and the large valve being of the differential type to provide large flow passages, the large valve being so disposed that the differential area is effectively exposed to incoming fluid whereby the pressure tends normally to open the large valve.

5. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, a weight normally tending to close the large valve and to open the small valve, said weight being moved out of the way of the small valve when the large valve is open, the small valve being so arranged that the pressure of liquid thereagainst tends normally to close the same, the opening of the small valve being only moderate in amount and such that even a small closing movement appreciably reduces the flow of liquid therethrough, and the large valve being so disposed that the fluid pressure tends normally to open the same.

6. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, said small valve tending normally to close, and being so disposed as to open against the direction of flow of liquid therethrough, whereby the liquid also tends to normally close the small valve, means bearing against the small valve to keep the small valve open, and mechanism associated with the large valve to move said means out of the way of the small valve and to make said means inoperative when the large valve opens, thereby creating a clearance for the small valve permitting the small valve to freely close when the large valve is opened.

7. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, the small valve tending normally to close and being so disposed as to open against the direction of flow of liquid therethrough, whereby the liquid also tends normally to close the small valve, and a weight tending under the influence of gravity to open the small valve and to close the large valve, said valves and weight being so arranged that opening of the large valve elevates the weight and thereby releases and permits closing of the small valve.

8. In a compound meter system comprising a large flow meter, a small flow meter arranged in parallel therewith, and compound valve mechanism for controlling the flow to the meters, a compound valve mechanism including large and small valves, the large valve being in series with the large meter alone and the small valve being in series with the small meter alone, the small valve tending normally to close and being so disposed as to open against the direction of flow of liquid therethrough, whereby the liquid also tends normally to close the small valve, and a weight tending under the influence of gravity to open the small valve and to close the large valve, said large valve being a differential valve tending to open when subjected to pressure, said valves and weight being so arranged that opening of the large valve elevates the weight and thereby releases and permits closing of the small valve.

9. In a compound meter system comprising a large flow meter, a small flow meter arranged in parallel therewith, and compound valve mechanism for controlling the flow to the meters, a compound valve mechanism including large and small valves, the large valve being in series with the large meter alone, and the small valve being in series with the small meter alone, said large valve being a differential valve so faced that water pressure tends normally to open the valve, said small valve being a poppet valve and being so disposed as to open against the direction of flow of liquid therethrough, whereby the liquid tends to normally close the small valve, means tending to close the large valve, means bearing against the small valve to keep the small valve open, and means associated with the large valve to move said last-named means out of the way of the small valve when the large valve opens, thereby creating a clearance for the small valve, permitting the small valve to freely close when the large valve is opened.

RAYMOND H. BARGE.